US011832615B2

(12) United States Patent
Ishikawa et al.

(10) Patent No.: US 11,832,615 B2
(45) Date of Patent: Dec. 5, 2023

(54) PLANT DISEASE CONTROL COMPOSITION AND PLANT DISEASE CONTROL METHOD

(71) Applicant: SUMITOMO CHEMICAL COMPANY, LIMITED, Tokyo (JP)

(72) Inventors: Ryo Ishikawa, Tokyo (JP); Shinji Isayama, Tokyo (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 359 days.

(21) Appl. No.: 17/144,662

(22) Filed: Jan. 8, 2021

(65) Prior Publication Data

US 2021/0127685 A1 May 6, 2021

Related U.S. Application Data

(62) Division of application No. 16/287,427, filed on Feb. 27, 2019, now Pat. No. 10,912,304, which is a division of application No. 15/100,182, filed as application No. PCT/JP2014/081916 on Nov. 26, 2014, now abandoned.

(30) Foreign Application Priority Data

Dec. 2, 2013 (JP) ................................ 2013-248951
Sep. 8, 2014 (JP) ................................ 2014-182036

(51) Int. Cl.
| | |
|---|---|
| *A01N 63/30* | (2020.01) |
| *A01N 63/22* | (2020.01) |
| *A01N 63/00* | (2020.01) |
| *A01N 43/40* | (2006.01) |
| *A01N 43/78* | (2006.01) |
| *A01N 57/12* | (2006.01) |
| *A01N 57/32* | (2006.01) |

(52) U.S. Cl.
CPC ............. *A01N 63/30* (2020.01); *A01N 43/40* (2013.01); *A01N 43/78* (2013.01); *A01N 57/12* (2013.01); *A01N 57/32* (2013.01); *A01N 63/00* (2013.01); *A01N 63/22* (2020.01)

(58) Field of Classification Search
CPC ................................ A01N 63/30; A01N 63/22
See application file for complete search history.

(56) References Cited

U.S. PATENT DOCUMENTS

| 8,574,566 B2 | 11/2013 | Prenerova et al. |
| 8,648,101 B2 | 2/2014 | Suwa |
| 2014/0364309 A1* | 12/2014 | Hellwege ............... A01N 43/40 424/93.46 |

FOREIGN PATENT DOCUMENTS

| JP | 2009-286708 A | 12/2009 |
| JP | 2012-246256 A | 12/2012 |
| WO | WO 2004/016088 A2 | 2/2004 |
| WO | WO 2013/110591 A1 | 8/2013 |
| WO | WO 2013/110594 A1 | 8/2013 |

OTHER PUBLICATIONS

European Patent Office Communication and extended search report issued in the corresponding European Patent Application No. 14867158.9 dated May 8, 2017.
European Patent Office Communication pursuant to Article 94(3) EPC issued in the corresponding European Patent Application No. 14867158.9 dated Jun. 28, 2018.
HCAPLUS abstract 2008:1199359 (2008).
HCAPLUS abstract 2009:1533116 (2009).
HCAPLUS abstract 2011:1530655 (2011).
International Preliminary Report on Patentability and Written Opinion of the International Searching Authority (Forms PCT/IB/373 and PCT/ISA/237), dated Feb. 17, 2015, for International Application No. PCT/JP2014/081916, together with an English translation thereof.
International Search Report issued in PCT/JP2014/081916, dated Feb. 17, 2015.

* cited by examiner

*Primary Examiner* — John Pak
(74) *Attorney, Agent, or Firm* — Birch, Stewart, Kolasch & Birch, LLP

(57) ABSTRACT

A composition for controlling plant diseases comprising *Paecilomyces fumosoroseus*, and one or more nematicidal active ingredients selected from specific groups has an excellent controlling effect on plant diseases.

4 Claims, No Drawings

PLANT DISEASE CONTROL COMPOSITION AND PLANT DISEASE CONTROL METHOD

CROSS-REFERENCE TO RELATED APPLICATIONS

This application is a Divisional application of co-pending application Ser. No. 16/287,427, filed on Feb. 27, 2019, which is a Divisional application of application Ser. No. 15/100,182, filed on May 27, 2016, which is the National Phase under 35 U.S.C. § 371 of International Application No. PCT/JP2014/081916, filed on Nov. 26, 2014, which claims the benefit under 35 U.S.C. § 119(a) to Patent Application No. 2013-248951, filed in Japan on Dec. 2, 2013 and Patent Application No. 2014-182036, filed in Japan on Sep. 8, 2014, all of which are hereby expressly incorporated by reference into the present application.

TECHNICAL FIELD

The present invention relates to a composition for controlling plant diseases and a method for controlling plant diseases.

BACKGROUND ART

Conventionally, many compounds (for example, refer to Non-Patent Document 1) and fungicides derived from microorganisms (for example, refer to Non-Patent Documents 2 and 3) have been used as an active ingredient of a plant disease controlling agent.

PRIOR ART DOCUMENTS

Non-Patent Documents

Non-Patent Document 1: The Pesticide Manual-16th edition (published by BCPC); ISBN 978-1-901396-86-7
Non-Patent Document 2: SHIBUYA INDEX (Index of Pesticides)-2012-16th edition (Zenkoku Nokyo Kyouiku Kyoukai); ISBN 978-4-88137-162-6
Non-Patent Document 3: Journal of Nematology 31(1): 54-61. 1999.

DISCLOSURE OF THE INVENTION

An object of the present invention is to provide a composition for controlling plant diseases having an excellent plant disease controlling effect, and a method for controlling plant diseases.

As a result of studying to find a composition for controlling plant diseases having an excellent plant disease controlling effect, the present inventors have found that a composition containing *Paecilomyces fumosoroseus*, and one or more nematicidal active ingredients selected from the group consisting of Group (A1) and Group (A2) has an excellent controlling effect on plant diseases.

More specifically, the present invention is as described below.

[1] A composition for controlling plant diseases comprising *Paecilomyces fumosoroseus*, and one or more nematicidal active ingredients selected from the group consisting of Group (A1) and Group (A2).
Group (A1): group consisting of aldicarb, thiodicarb, carbofuran, carbosulfan, dimethoate, fenamiphos, imicyafos, fensulfothion, terbufos, fosthiazate, dichlofenthion, isamidofos, fosthietan, isazofos, ethoprophos, cadusafos, phorate, thionazin, triazophos, diamidafos, phosphamidon, fluensulfone, MEP (fenitrothion), and fluopyram.
Group (A2): group consisting of Harpin protein, *Pasteuria nishizawae, Pasteuria penetrans, Pasteuria usgae, Myrothecium verrucaria, Burkholderia cepacia, Bacillus amyloliquefaciens, Bacillus firmus, Bacillus subtillis, Bacillus pumulis, Trichoderma harzianum, Verticillium chlamydosporum,* and *Bacillus megaterium*.
[2] The composition for controlling plant diseases according to [1], wherein the nematicidal active ingredients are one or more nematicidal active ingredients selected from Group (A1), and the ratio of the number (CFU) of *Paecilomyces fumosoroseus* to the amount (g) of the nematicidal active ingredients selected from Group (A1) is number of bacteria (CFU):amount (g)=$10^7$:1 to $10^{17}$:1.
[3] The composition for controlling plant diseases according to [1], wherein the nematicidal active ingredients are one or more nematicidal active ingredients selected from Group (A2), and the ratio of the number of *Paecilomyces fumosoroseus* to the amount of the nematicidal active ingredients selected from Group (A2) is number of bacteria (CFU): number of bacteria (CFU)=$1:10^5$ to $10^5$:1.
[4] A method for controlling plant diseases comprising applying an effective amount of the composition for controlling plant diseases as defined in any one of [1] to [3] to a seed, a plant, or soil for cultivating a plant.
[5] A plant seed treated with an effective amount of the composition for controlling plant diseases as defined in any one of [1] to [3].
[6] The composition for controlling plant diseases according to any one of [1] to [3], wherein the plant disease is a soil-borne disease.
[7] The controlling method according to [4], wherein the plant disease is a soil-borne disease.
[8] The plant seed according to [5], wherein the plant disease is a soil-borne disease.

MODE FOR CARRYING OUT THE INVENTION

The composition for controlling plant diseases of the present invention contains *Paecilomyces fumosoroseus*, and one or more nematicidal active ingredients selected from the group consisting of Group (A1) and Group (A2).

*Paecilomyces fumosoroseus* used in the composition for controlling plant diseases of the present invention is a filamentous fungus described in Pest Management Science (2012), 68(4), 573-579 and Crop Protection 20 (2001) 767-778, and includes strain FE9901 (NOFLY (registered trademark), accession number: NITE BP-01876, original deposition date: Jun. 18, 2014, deposited to National Institute of Technology and Evaluation, NITE Patent Microorganisms Depositary, room 122, 2-5-8, Kazusakamatari, Kisarazu-shi, Chiba, Japan 292-0818), strain Apopka 97 (Preferred (PreFeRal (registered trademark), PFR-97 (registered trademark)), and the like, and can be obtained from commercially available formulations such as NOFLY (registered trademark) and PreFeRal (registered trademark) or isolated and cultured by a known method.

The nematicidal active ingredient used in the composition for controlling plant diseases of the present invention represents a component that controls nematodes. Specifically, the nematicidal active ingredient includes one or more components selected from the group consisting of Group (A1) and Group (A2).

Among Group (A1), aldicarb, thiodicarb, carbofuran and carbosulfan are known as carbamate-based components, and dimethoate, fenamiphos, imicyafos, fensulfothion, terbufos, fosthiazate, dichlofenthion, isamidofos, fosthietan, isazofos, ethoprophos, cadusafos, phorate, thionazin, triazophos, diamidafos, phosphamidon, fluensulfone and MEP are known as organophosphorus components.

Also, the components of Group (A2) are known as bacteria derived from microorganisms.

Aldicarb, thiodicarb, carbofuran, carbosulfan, dimethoate, fenamiphos, imicyafos, fensulfothion, terbufos, fosthiazate, dichlofenthion, isamidofos, fosthietan, isazofos, ethoprophos, cadusafos, phorate, thionazin, triazophos, diamidafos, phosphamidon, fluensulfone, MEP, fluopyram, Harpin protein, *Pasteuria nishizawae, Pasteuria penetrans, Pasteuria usgae, Myrothecium verrucaria, Burkholderia cepacia, Bacillus amyloliquefaciens, Bacillus firmus, Bacillus subtillis, Bacillus pumulis, Trichoderma harzianum, Verticillium chlamydosporum, Bacillus megaterium* (NoNem: tradename) are all known components, and described, for example, in pages 24, 1115, 158, 160, 369, 454, 639, 1211, 1081, 573, 323, 1216, 1213, 1216, 437, 148, 883, 1230, 1143, 1203, 887, 513, 465 and 528 of "The Pesticide Manual—16th edition (published by BCPC); ISBN 978-1-901396-86-7", and pages 92, 72, 72, 72, 74, 72, 162, 71, 162, 162, 166, and 75 of "SHIBUYA INDEX (Index of Pesticides)—2012—16th edition (Zenkoku Nokyo Kyouiku Kyoukai); ISBN 978-4-88137-162-6", and Journal of Nematology 31(1): 54-61. 1999., and can be obtained from commercially available formulations, produced or isolated and cultured by a known method.

The content ratio of *Paecilomyces fumosoroseus* to the nematicidal active ingredients in the composition for controlling plant diseases of the present invention is not particularly limited, but typically, the ratio of the number of *Paecilomyces fumosoroseus* to the amount of the nematicidal active ingredients selected from Group (A1) is number of bacteria (CFU):amount (g)=$10^7$:1 to $10^{17}$:1, and preferably number of bacteria (CFU):amount (g)=1:$10^8$ to $10^{13}$:1, and the ratio of the number of *Paecilomyces fumosoroseus* to the amount of the nematicidal active ingredients selected from Group (A2) is number of bacteria (CFU):number of bacteria (CFU)=1:$10^5$ to $10^5$:1, and preferably number of bacteria (CFU):number of bacteria (CFU)=1:$10^2$ to $10^2$:1

The composition for controlling plant diseases of the present invention may be a simple mixture of *Paecilomyces fumosoroseus* and one or more nematicidal active ingredients selected from the group consisting of Group (A1) and Group (A2), but typically, obtained by mixing *Paecilomyces fumosoroseus*, one or more nematicidal active ingredients selected from the group consisting of Group (A1) and Group (A2), and an inert carrier such as a solid carrier or a liquid carrier, and adding a surfactant or other auxiliaries for formulation as necessary, to be formulated into emulsifiable oil formulations, emulsions, flowable agents, wettable powder, wettable granules, dust formulations, granules, and the like. Also, the composition for controlling plant diseases of the present invention can be used as it is or as a seed treatment agent of the present invention by adding other inert component.

In the composition for controlling plant diseases of the present invention, the total content of *Paecilomyces fumosoroseus* and one or more nematicidal active ingredients selected from the group consisting of Group (A1) and Group (A2) is typically 0.1 to 99% by weight, and preferably 0.2 to 90% by weight.

Examples of the solid carrier used upon formulation include fine powders or granules of minerals such as kaolin clay, attapulgite clay, bentonite, montmorillonite, acid white clay, pyrophyllite, talc, diatomaceous earth and calcite, natural organic materials such as corn cob powder and walnut husk powder, synthetic organic materials such as urea, salts such as calcium carbonate and ammonium sulfate, synthetic inorganic materials such as synthetic hydrated silicon oxide, and the like. Examples of the liquid carrier include aromatic hydrocarbons such as xylene, alkylbenzene and methylnaphthalene, alcohols such as 2-propanol, ethylene glycol, propylene glycol and ethylene glycol monoethyl ether, ketones such as acetone, cyclohexanone and isophorone, vegetable oils such as soybean oil and cotton seed oil, and petroleum aliphatic hydrocarbons, esters, dimethylsulfoxide, acetonitrile, and water.

Examples of the surfactant include anionic surfactants such as alkyl sulfonate ester salts, alkylaryl sulfonate salts, dialkyl sulfosuccinate salts, polyoxyethylene alkyl aryl ether phosphate ester salts, lignosulfonate salts and naphthalene sulfonate formaldehyde polycondensates, nonionic surfactants such as polyoxyethylene alkyl aryl ethers, polyoxyethylene alkylpolyoxypropylene block copolymers and sorbitan fatty acid esters, and cationic surfactants such as alkyltrimethylammonium salts.

Examples of the other auxiliaries for formulation include water-soluble polymers such as polyvinyl alcohol and polyvinyl pyrrolidone, polysaccharides such as arabic gum, alginic acid and salts thereof, CMC (carboxymethyl cellulose) and xanthan gum, inorganic materials such as aluminum magnesium silicate and alumina sol, preservatives, colorants and stabilizers such as PAP (isopropyl acid phosphate) and BHT.

The composition for controlling plant diseases of the present invention can be also prepared by formulating *Paecilomyces fumosoroseus* and one or more nematicidal active ingredients selected from the group consisting of Group (A1) and Group (A2) respectively by the methods described above, then mixing each of the formulations diluted with water as necessary, or their diluents.

The composition for controlling plant diseases of the present invention may further contain one or more fungicides.

Examples of the plant disease that can be controlled by the present invention include the following.

Rice diseases: *Magnaporthe grisea, Cochliobolus miyabeanus, Rhizoctonia solani*, and *Gibberella fujikuroi.*

Wheat diseases: *Erysiphe graminis, Fusarium graminearum, F. avenacerum, F. culmorum, Microdochium nivale, Puccinia striiformis, P. graminis, P. recondita, Micronectriella nivale, Typhula* spp., *Ustilago tritici, Tilletia caries, Pseudocercosporella herpotrichoides, Mycosphaerella graminicola, Stagonospora nodorum*, and *Pyrenophora tritici-repentis.*

Barley diseases: *Erysiphe graminis, Fusarium graminearum, F. avenacerum, F. culmorum, Microdochium nivale, Puccinia striiformis, P. graminis, P. hordei, Ustilago nuda, Rhynchosporium secalis, Pyrenophora teres, Cochliobolus sativus, Pyrenophora graminea*, and *Rhizoctonia solani* by genus *Rhizoctonia.*

Corn diseases: *Ustilago maydis, Cochliobolus heterostrophus, Gloeocercospora sorghi, Puccinia polysora, Cercospora zeae-maydis*, and *Rhizoctonia solani* by genus *Rhizoctonia.*

Citrus diseases: *Diaporthe citri, Elsinoe fawcetti, Penicillium digitatum, P. italicum, Phytophthora parasitica*, and *Phytophthora citrophthora.*

Apple diseases: *Monilinia mali, Valsa ceratosperma, Podosphaera leucotricha, Alternaria alternata* apple pathotype, *Venturia inaequalis, Colletotrichum acutatum, Phy-* tophtora cactorum, Diplocarpon mali, Botryosphaeria berengeriana, and Helicobasidium mompa.

Pear diseases: *Venturia nashicola, V. pirina, Alternaria alternata* Japanese pear pathotype, *Gymnosporangium haraeanum*, and *Phytophtora cactorum*.

Peach diseases: *Monilinia fructicola, Cladosporium carpophilum*, and *Phomopsis* spp.

Grape diseases: *Elsinoe ampelina, Glomerella cingulata, Uncinula necator, Phakopsora ampelopsidis, Guignardia bidwellii*, and *Plasmopara viticola*.

Persimmon diseases: *Gloeosporium kaki, Cercospora kaki*, and *Mycosphaerella nawae*.

Gourd diseases: *Colletotrichum lagenarium, Sphaerotheca fuliginea, Mycosphaerella melonis, Fusarium oxysporum, Pseudoperonospora cubensis, Phytophthora* spp., and *Pythium* spp.

Tomatodiseases: *Alternaria solani, Cladosporium fulvum, Phytophthora infestans, Ralstonia solanacearum*, and *Fusarium oxysporum* f. sp. *lycopersici*.

Eggplant diseases: *Phomopsis vexans, Erysiphe cichoracearum, Ralstonia solanacearum*, and *Verticillium dahliae*.

Cruciferous vegetable diseases: *Alternaria japonica, Cercosporella brassicae, Plasmodiophora brassicae*, and *Peronospora parasitica*.

Welsh onion diseases: *Puccinia allii* and *Peronospora destructor*.

Soybean diseases: *Cercospora kikuchii, Elsinoe glycines, Diaporthe phaseolorum* var. *sojae, Septoria glycines, Cercospora sojina, Phakopsora pachyrhizi, Phytophthora sojae*, and *Rhizoctonia solani* by genus *Rhizoctonia*.

Kidney bean diseases: *Colletotrichum lindemthianum*. Peanut diseases: *Cercospora personata, Cercospora arachidicola*, and *Sclerotium rolfsii*.

Pea diseases: *Erysiphe pisi* and *Fusarium solani* F. sp. *pisi*

Potato diseases: *Alternaria solani, Phytophthora infestans, Phytophthora erythroseptica, Spongospora subterranean* F. sp. *subterranea, Rhizoctonia solani*, and *Ralstonia solanacearum*.

Strawberry diseases: *Sphaerotheca humuli* and *Glomerella cingulata*.

Tea diseases: *Exobasidium reticulatum, Elsinoe leucospila, Pestalotiopsis* spp., and *Colletotrichum theae-sinensis*.

Tobacco diseases: *Alternaria longipes, Erysiphe cichoracearum, Colletotrichum tabacum, Peronospora tabacina*, and *Phytophthora nicotianae*.

Rapeseed diseases: *Sclerotinia sclerotiorum*, and *Rhizoctonia solani* by genus *Rhizoctonia*.

Cotton diseases: *Rhizoctonia solani* by genus *Rhizoctonia*.

Sugar beet diseases: *Cercospora beticola, Rhizoctonia solani, Rhizoctonia solani*, and *Aphanomyces cochlioides*.

Rose diseases: *Diplocarpon rosae, Sphaerotheca pannosa*, and *Peronospora sparsa*.

Crysanthemums and Compositae vegetable diseases: *Bremia lactucae, Septoria chrysanthemi-indici*, and *Puccinia horiana*.

Various plant diseases: diseases caused by genus *Pythium* (*Pythium debarianum, Pythium graminicola, Pythium irregulare, Pythium ultimum*), *Botrytis cinerea, Sclerotinia sclerotiorum*, and *Sclerotium rolfsii*.

Japanese radish diseases: *Alternaria brassicicola*.

Lawn diseases: *Sclerotinia homeocarpa*, and *Rhizoctonia solani*.

Banana diseases: *Mycosphaerella fijiensis* and *Mycosphaerella musicola*.

Sunflower diseases: *Plasmopara halstedii*.

Seed-borne diseases of various plants or diseases at the initial stage of growth, caused by genus *Aspergillus*, genus *Penicillium*, genus *Fusarium*, genus *Gibberella*, genus *Tricoderma*, genus *Thielaviopsis*, genus *Rhizopus*, genus *Mucor*, genus *Corticium*, genus *Phoma*, genus *Rhizoctonia*, genus *Diplodia*, and the like.

Viral diseases of various plants mediated by genus *Polymixa*, genus *Olpidium* or the like.

In the present invention, the soil-borne disease represents a disease transmitted via soil where plant pathogens are present, and examples include *Ralstonia solanacearum, Plasmodiophora brassicae, Phytophthora sojae, Fusarium oxysporum* f. sp. *lycopersici*, and chlorosis. The composition of the present invention is particularly effective on soil-borne disease.

Plant diseases can be controlled by applying effective amounts of *Paecilomyces fumosoroseus* and one or more nematicidal active ingredients selected from the group consisting of Group (A1) and Group (A2) to a plant or to such a place (plant, soil, etc.) where the plant pathogens inhabit or may inhabit.

Plant diseases can be controlled by applying effective amounts of *Paecilomyces fumosoroseus* and one or more nematicidal active ingredients selected from the group consisting of Group (A1) and Group (A2) to a seed, a plant, or a soil for cultivating a plant. Examples of the plant which is the object of the application include foliages of plant and the like, and the seeds of plant also include bulbs of plant. As used herein, the bulb means a bulb, corm, rhizome, stem tuber, root tuber and rhizophore.

When applied to a plant, a soil for cultivating a plant, or the like, *Paecilomyces fumosoroseus* and one or more nematicidal active ingredients selected from the group consisting of Group (A1) and Group (A2) may be separately applied for the same period, but they are typically applied as the composition for controlling plant diseases of the present invention for simplicity of the application.

Examples of the controlling method of the present invention specifically include treatment of foliage of plants, such as foliage spraying; treatment of cultivation lands of plants, such as soil treatment; treatment of seeds, such as seed sterilization and seed coating; treatment of bulbs such as seed tuber; and the like.

Examples of the treatment of plants in the controlling method of the present invention include a treatment method of allowing the composition of the present invention directly absorb to plants before transplantation and treatment methods of applying the composition of the present invention to surfaces of plants, such as foliage spraying and trunk spraying. Examples of the treatment method of allowing the composition of the present invention directly absorb to plants before transplantation include a method of soaking entire plants or roots in a liquid containing the composition of the present invention, and a method of adhering a formulation of the composition of the present invention obtained by using a solid carrier such as a mineral powder, to the roots.

Examples of the method of treating cultivation lands of plants with the composition of the present invention in the controlling method of the present invention include spraying onto the soil, soil incorporation, and perfusion of a chemical liquid into the soil (irrigation of chemical liquid, soil injection, and dripping of chemical liquid). Examples of the place to be treated include planting hole, furrow, around a planting hole, around a furrow, entire surface of cultivation lands, the parts between the soil and the plant, area between roots, area beneath the trunk, main furrow, growing soil, seedling raising box, seedling raising tray, seedbed, and the like. Examples of the treating period include before seeding, at the time of seeding, immediately after seeding, raising period, before settled planting, at the time of settled planting, growing period after settled planting, and the like. Also, in the treatment of cultivation lands of plants, a solid fertilizer such as a paste fertilizer containing an active ingredient may be applied to the soil. When treating an active ingredient to the cultivation land of the plant, the active ingredient may be also treated to the plant. Also, the composition of the present invention may be mixed in an irrigation liquid, and examples include injecting to irrigation facilities (such as irrigation tube, irrigation pipe and sprinkler), mixing into the flooding liquid between furrows, mixing into a water culture medium, and the like. Alternatively, an irrigation liquid is mixed with active ingredients in advance and, for example, can be treated using an appropriate irrigating method including the irrigating method mentioned above and the other methods such as sprinkling and flooding.

Examples of the method of treating seeds with the composition of the present invention in the controlling method of the present invention include a method for treating seeds to be protected from plant diseases with the composition for controlling plant diseases of the present invention, and specific examples include a spraying treatment in which a suspension of the composition for controlling plant diseases of the present invention is atomized and sprayed on the seed surface; a smearing treatment in which a wettable powder, an emulsion or a flowable agent of the composition for controlling plant diseases of the present invention is applied to seeds with a small amount of water added or without dilution; an immersing treatment in which seeds are immersed in a solution of the composition for controlling plant diseases of the present invention for a certain period of time; film coating treatment; and pellet coating treatment.

When treating a plant, or a soil for cultivating a plant with *Paecilomyces fumosoroseus* and one or more nematicidal active ingredients selected from the group consisting of Group (A1) and Group (A2), the treatment amount may be changed depending on the kind of the plant to be treated, the kind and the occurring frequency of the plant diseases to be controlled, formulation form, treatment period, climatic condition and the like, but the total content of *Paecilomyces fumosoroseus* and one or more nematicidal active ingredients selected from the group consisting of Group (A1) and Group (A2) (hereinafter referred to as "the amount of the active ingredients".) per 10,000 m$^2$ is typically 1 to 5,000 g and preferably 2 to 500 g.

The emulsion, wettable powder, flowable agent and the like are typically diluted with water, and then sprinkled for the treatment. In these case, the concentration of the amount of the active ingredients is typically 0.0001 to 3% by weight and preferably 0.0005 to 1% by weight. The powder agent, granules and the like are typically used for the treatment without being diluted.

In the treatment of seeds, the amount of the active ingredients is typically 0.001 to 10 g, and preferably 0.01 to 3 g per 1 kg of seeds.

The control method of the present invention can be used in agricultural lands such as fields, paddy fields, lawns and orchards or in non-agricultural lands.

Also, the present invention can be used for controlling plant diseases of agricultural lands without adversely affecting the plant and the like, in the agricultural lands for cultivating the following "plant" and the like.

Crops: corn, rice, wheat, barley, rye, oat, sorghum, cotton, soybean, peanut, sarrazin, sugar beet, rapeseed, sunflower, sugar cane, tobacco, etc.; Vegetables: Solanaceae vegetables (eggplant, tomato, green pepper, hot pepper, potato, etc.), Cucurbitaceae vegetables (cucumber, pumpkin, zucchini, watermelon, melon, squash, etc.), Cruciferae vegetables (Japanese radish, turnip, turnip, horseradish, kohlrabi, Chinese cabbage, cabbage, brown mustard, broccoli, cauliflower, etc.), Compositae vegetables (burdock, garland *chrysanthemum*, artichoke, lettuce, etc.), Liliaceae vegetables (Welsh onion, onion, garlic, asparagus, etc.), Umbelliferae vegetables (carrot, parsley, celery, parsnip, etc.), Chenopodiaceae vegetables (spinach, Swiss chard, etc.), Labiatae vegetables (Japanese mint, mint, basil, etc.), strawberry, sweet potato, yam, aroid, etc.;

Flowers;

Ornamental foliage plants;

Lawn;

Fruit trees: pomaceous fruits (apple, common pear, Japanese pear, Chinese quince, quince, etc.), stone fleshy fruits (peach, plum, nectarine, Japanese plum, cherry, apricot, prune, etc.), citrus plants (Satsuma mandarin, orange, lemon, lime, grapefruits, etc.), nuts (chestnut, walnut, hazel nut, almond, pistachio, cashew nut, macadamia nut, etc.), berry fruits (blueberry, cranberry, blackberry, raspberry, etc.), grape, persimmon, olive, loquat, banana, coffee, date, coconut, etc.;

Trees other than fruit trees: tea, mulberry, flowering plants, *Jatropha curucas*, street trees (ash tree, birch, dogwood, *eucalyptus*, ginkgo, lilac, maple tree, oak, poplar, *cercis*, Chinese sweet gum, plane tree, *zelkova*, Japanese arborvitae, fir tree, Japanese hemlock, needle juniper, pine, spruce, yew), etc.

Particularly, the control method of the present invention can be used to control diseases in agricultural lands for cultivating corn, rice, wheat, barley, sorghum, cotton, soybean, beet, rapeseed, lawn or potato.

The above plants also contain genetically modified plants.

EXAMPLES

Hereinbelow, the present invention will be further described in detail by formulation examples and test examples. However, the present invention is not limited to the following examples. In the following examples, the part means part by weight unless otherwise specifically noted.

Formulation Example 1

Two parts of *Paecilomyces fumosoroseus* (strain FE9901) spore, 2 parts of fluopyram, 72 parts of SALACOS (registered trademark) 5408 (manufactured by The Nisshin OilliO Group, Ltd.), 17 parts of COSMOL (registered trademark) 44V (manufactured by The Nisshin OilliO Group, Ltd.) and 10 parts of Pegnol (registered trademark) 24-0 (manufactured by TOHO Chemical Industry Co., Ltd.) are well mixed to obtain a formulation.

Formulation Example 2

Two parts of *Paecilomyces fumosoroseus* (strain FE9901) spore, 2 parts of MEP (fenitrothion), 72 parts of SALACOS (registered trademark) 5408 (manufactured by The Nisshin OilliO Group, Ltd.), 17 parts of COSMOL (registered trademark) 44V (manufactured by The Nisshin OilliO Group, Ltd.) and 10 parts of Pegnol (registered trademark) 24-0

Formulation Example 3

Two parts of *Paecilomyces fumosoroseus* (strain FE9901) spore, 2 parts of fluensulfone, 72 parts of SALACOS (registered trademark) 5408 (manufactured by The Nisshin OilliO Group, Ltd.), 17 parts of COSMOL (registered trademark) 44V (manufactured by The Nisshin OilliO Group, Ltd.) and 10 parts of Pegnol (registered trademark) 24-0 (manufactured by TOHO Chemical Industry Co., Ltd.) are well mixed to obtain a formulation.

Formulation Example 4

Two parts of *Paecilomyces fumosoroseus* (strain FE9901) spore, 2 parts of aldicarb, 72 parts of SALACOS (registered trademark) 5408 (manufactured by The Nisshin OilliO Group, Ltd.), 17 parts of COSMOL (registered trademark) 44V (manufactured by The Nisshin OilliO Group, Ltd.) and 10 parts of Pegnol (registered trademark) 24-0 (manufactured by TOHO Chemical Industry Co., Ltd.) are well mixed to obtain a formulation.

Formulation Example 5

Two parts of *Paecilomyces fumosoroseus* (strain FE9901) spore, 2 parts of ethoprophos, 72 parts of SALACOS (registered trademark) 5408 (manufactured by The Nisshin OilliO Group, Ltd.), 17 parts of COSMOL (registered trademark) 44V (manufactured by The Nisshin OilliO Group, Ltd.) and 10 parts of Pegnol 2 (registered trademark) 4-0 (manufactured by TOHO Chemical Industry Co., Ltd.) are well mixed to obtain a formulation.

Formulation Example 6

Two parts of *Paecilomyces fumosoroseus* (strain FE9901) spore, 2 parts of fenamiphos, 72 parts of SALACOS (registered trademark) 5408 (manufactured by The Nisshin OilliO Group, Ltd.), 17 parts of COSMOL (registered trademark) 44V (manufactured by The Nisshin OilliO Group, Ltd.) and 10 parts of Pegnol (registered trademark) 24-0 (manufactured by TOHO Chemical Industry Co., Ltd.) are well mixed to obtain a formulation.

Formulation Example 7

Two parts of *Paecilomyces fumosoroseus* (strain FE9901) spore, 2 parts of fosthiazate, 72 parts of SALACOS (registered trademark) 5408 (manufactured by The Nisshin OilliO Group, Ltd.), 17 parts of COSMOL (registered trademark) 44V (manufactured by The Nisshin OilliO Group, Ltd.) and 10 parts of Pegnol (registered trademark) 24-0 (manufactured by TOHO Chemical Industry Co., Ltd.) are well mixed to obtain a formulation.

Formulation Example 8

Two parts of *Paecilomyces fumosoroseus* (strain FE9901) spore, 2 parts of cadusafos, 72 parts of SALACOS (registered trademark) 5408 (manufactured by The Nisshin OilliO Group, Ltd.), 17 parts of COSMOL (registered trademark) 44V (manufactured by The Nisshin OilliO Group, Ltd.) and 10 parts of Pegnol (registered trademark) 24-0 (manufactured by TOHO Chemical Industry Co., Ltd.) are well mixed to obtain a formulation.

Formulation Example 9

Two parts of *Paecilomyces fumosoroseus* (strain FE9901) spore, 2 parts of imicyafos, 72 parts of SALACOS (registered trademark) 5408 (manufactured by The Nisshin OilliO Group, Ltd.), 17 parts of COSMOL (registered trademark) 44V (manufactured by The Nisshin OilliO Group, Ltd.) and 10 parts of Pegnol (registered trademark) 24-0 (manufactured by TOHO Chemical Industry Co., Ltd.) are well mixed to obtain a formulation.

Formulation Example 10

Two parts of *Paecilomyces fumosoroseus* (strain FE9901) spore, 2 parts of terbufos, 72 parts of SALACOS (registered trademark) 5408 (manufactured by The Nisshin OilliO Group, Ltd.), 17 parts of COSMOL (registered trademark) 44V (manufactured by The Nisshin OilliO Group, Ltd.) and 10 parts of Pegnol (registered trademark) 24-0 (manufactured by TOHO Chemical Industry Co., Ltd.) are well mixed to obtain a formulation.

Formulation Example 11

Two parts of *Paecilomyces fumosoroseus* (strain FE9901) spore, 2 parts of *Bacillus firmus,* 72 parts of SALACOS (registered trademark) 5408 (manufactured by The Nisshin OilliO Group, Ltd.), 17 parts of COSMOL (registered trademark) 44V (manufactured by The Nisshin OilliO Group, Ltd.) and 10 parts of Pegnol (registered trademark) 24-0 (manufactured by TOHO Chemical Industry Co., Ltd.) are well mixed to obtain a formulation.

Formulation Example 12

Two parts of *Paecilomyces fumosoroseus* (strain FE9901) spore, 2 parts of *Pasteuria* usgae, 72 parts of SALACOS (registered trademark) 5408 (manufactured by The Nisshin OilliO Group, Ltd.), 17 parts of COSMOL (registered trademark) 44V (manufactured by The Nisshin OilliO Group, Ltd.) and 10 parts of Pegnol (registered trademark) 24-0 (manufactured by TOHO Chemical Industry Co., Ltd.) are well mixed to obtain a formulation.

Formulation Example 13

Two parts of *Paecilomyces fumosoroseus* (strain FE9901) spore, 2 parts of *Pasteuria nishizawae,* 72 parts of SALACOS (registered trademark) 5408 (manufactured by The Nisshin OilliO Group, Ltd.), 17 parts of COSMOL (registered trademark) 44V (manufactured by The Nisshin OilliO Group, Ltd.) and 10 parts of Pegnol (registered trademark) 24-0 (manufactured by TOHO Chemical Industry Co., Ltd.) are well mixed to obtain a formulation.

Formulation Example 14

Two parts of *Paecilomyces fumosoroseus* (strain FE9901) spore, 2 parts of *Bacillus megaterium,* 72 parts of SALACOS (registered trademark) 5408 (manufactured by The Nisshin OilliO Group, Ltd.), 17 parts of COSMOL (registered trademark) 44V (manufactured by The Nisshin OilliO Group, Ltd.) and 10 parts of Pegnol (registered trademark)

24-0 (manufactured by TOHO Chemical Industry Co., Ltd.) are well mixed to obtain a formulation.

Test Example 1

Seventy-five milliliters of a suspension ($1\times10^6$ CFU/ml) of *Paecilomyces fumosoroseus* (strain FE9901, accession number: NITE BP-01876) spore and a prescribed amount of nematicidal active ingredients were treated to a pot with a radius of 9 cm filled with *Ralstonia solanacearum*-contaminated soil, and well mixed. Four days after chemical treatment, tomato seedlings were transplanted to this pot. One week after transplantation, a *Ralstonia solanacearum* suspension was inoculated to the pot by drench, and tomato was cultivated in a glasshouse, at a daytime room temperature of 30° C. and a night room temperature of 20° C. Thirty-three days after transplantation, the disease index was assessed from the degree of wilting of tomato, and the disease severity was calculated by the following equation, based on the disease index. The disease severity is defined as a disease severity of treated plants.

Tomato was cultivated in the same manner as described above, except for not treating *Paecilomyces fumosoroseus* and nematicidal active ingredients, and the disease severity was calculated. The disease severity is defined as a disease severity of untreated plants.

The controlling value was calculated from the disease severity of treated plants and the disease severity of untreated plants.

Disease index
0: no symptom of disease is found
1: wilting of the shoot apices is observed
2: wilting of the leaves is observed
3: the whole plant is wilted
4: the plant withers and dies Disease severity=100×[{1×(number of plant with disease index of 1)+2×(number of plant with disease index of 2)+3×(number of plant with disease index of 3)+4×(number of plant with disease index of 4)}/{4×(total number of plant)}]

$$\text{Controlling value (\%)}=100\times(A-B)/A$$

A: disease severity of untreated plants
B: disease severity of treated plants

The result is shown in Table 1. In the table, "−" represents the case of not containing *Paecilomyces fumosoroseus*, and "+" represents the case of containing *Paecilomyces fumosoroseus* ($3\times10^9$ CFU/$m^2$).

TABLE 1

| Paecilomyces fumosoroseus ($3 \times 10^9$ CFU/$m^2$) | Nematicidal active ingredients (dosage mgAI/$m^2$) | Controlling value (%) |
|---|---|---|
| − | Fosthiazate (300) | 0 |
| + | Fosthiazate (300) | 85 |
| − | Imicyafos (300) | 50 |
| + | Imicyafos (300) | 100 |
| − | Fluopyram (10) | 0 |
| + | Fluopyram (10) | 62 |
| − | Cadusafos (900) | 50 |
| + | Cadusafos (900) | 100 |
| − | Fluensulfone (400) | 0 |
| + | Fluensulfone (400) | 85 |
| − | — | 0 |
| + | — | 39 |

As a result, when treating *Paecilomyces fumosoroseus* and nematicidal active ingredients, an excellent controlling effect was exhibited on plant diseases.

Test Example 2

One hundred milliliters of a suspension ($1\times10^6$ CFU/ml) of *Paecilomyces fumosoroseus* (strain FE9901, accession number: NITE BP-01876) spore and a prescribed amount of nematicidal active ingredients were treated to a pot with a radius of 11 cm filled with *Ralstonia solanacearum*-contaminated soil, and well mixed. Thirteen days after chemical treatment, tomato seedlings were transplanted to this pot. One day after transplantation, a *Ralstonia solanacearum* suspension was inoculated to the pot by drench, and tomato was cultivated in a glasshouse, at a daytime room temperature of 35° C. and a night room temperature of 25° C. Seventeen days after transplantation, the disease index was assessed from the degree of wilting of tomato, and the disease severity was calculated by the following equation, based on the disease index. The disease severity is defined as a disease severity of treated plants.

Tomato was cultivated in the same manner as described above, except for not treating *Paecilomyces fumosoroseus* and nematicidal active ingredients, and the disease severity was calculated. The disease severity is defined as a disease severity of untreated plants.

The controlling value was calculated from the disease severity of treated plants and the disease severity of non-treated plants.

Disease index
0: no symptom of disease is found
1: wilting of the shoot apices is observed
2: wilting of the leaves is observed
3: the whole plant is wilted
4: the plant withers and dies Disease severity=100×[{1×(number of plant with disease index of 1)+2×(number of plant with disease index of 2)+3×(number of plant with disease index of 3)+4×(number of plant with disease index of 4)}/{4×(total number of plant)}]

$$\text{Controlling value (\%)}=100-(A-B)/A$$

A: disease severity of untreated plants
B: disease severity of treated plants

The result is shown in Table 2. In the table, "−" represents the case of not containing *Paecilomyces fumosoroseus*, and "+" represents the case of containing *Paecilomyces fumosoroseus* ($3\times10^9$ CFU/$m^2$).

TABLE 2

| Paecilomyces fumosoroseus ($3 \times 10^9$ CFU/$m^2$) | Nematicidal active ingredients | Controlling value (%) |
|---|---|---|
| − | MEP (10 mgAI/$m^2$) | 0 |
| + | MEP (10 mgAI/$m^2$) | 75 |
| − | *Bacillus firmus* ($6 \times 10^8$ CFU/$m^2$) | 0 |
| + | *Bacillus firmus* ($6 \times 10^8$ CFU/$m^2$) | 50 |
| − | — | 0 |
| + | — | 25 |

As a result, when treating *Paecilomyces fumosoroseus* and nematicidal active ingredients, an excellent controlling effect was exhibited on plant diseases.

INDUSTRIAL APPLICABILITY

Plant diseases can be controlled, according to the present invention.

The invention claimed is:

1. A composition for controlling plant diseases comprising *Paecilomyces fumosoroseus*, and a nematicidal active ingredient selected from Group (A2), wherein the ratio of the number of *Paecilomyces fumosoroseus* (CFU) to the number of the nematicidal active ingredient selected from Group (A2) (CFU) is $1:10^2$ to $10^2:1$;

Group (A2): *Bacillus firmus*.

2. A method for controlling plant diseases comprising applying an effective amount of the composition for controlling plant diseases as defined in claim 1 to a seed, a plant, or soil for cultivating a plant.

3. A plant seed treated with an effective amount of the composition for controlling plant diseases as defined in claim 1.

4. The controlling method according to claim 2, wherein the plant disease is a soil-borne disease.

* * * * *